Nov. 5, 1946.  J. W. CONKLIN  2,410,599
REMOTE CONTROL SYSTEM
Filed Feb. 24, 1943
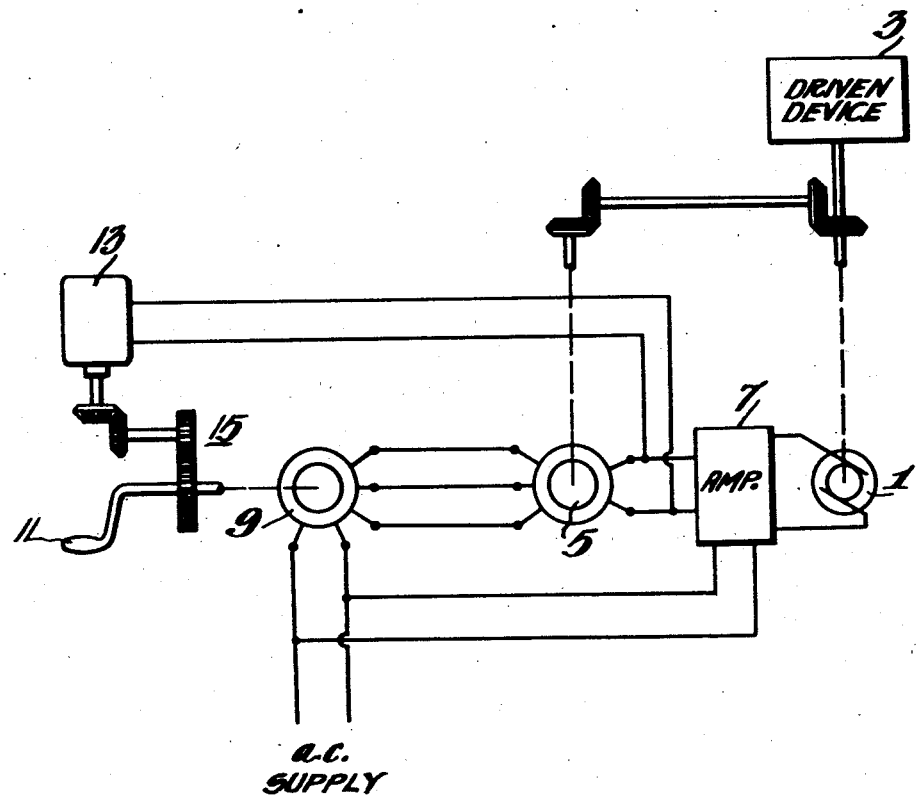
Inventor
James W. Conklin
By
C. D. Tuska
Attorney Patented Nov. 5, 1946

2,410,599

UNITED STATES PATENT OFFICE 2,410,599

REMOTE CONTROL SYSTEM

James W. Conklin, Indianapolis, Ind., assignor to Radio Corporation of America, a corporation of Delaware Application February 24, 1943, Serial No. 476,902

4 Claims. (Cl. 172—239)

1

This invention relates to electrical servo systems of the follow-up type and more particularly to the prevention of operation of the control member of such systems at a rate exceeding the maximum speed capability of the driving motor. The usual servo system comprises a control input shaft, an output shaft, means for producing control voltage related in some predetermined manner to the difference in the angular positions of said shafts, and a driving motor controlled by said voltage to reduce said difference to zero. Upon rotation of the control shaft, the driving motor will operate the output shaft at the same rate, with an angular lag depending on the constants of the system. In general, this lag increases with increase in speed of operation of the control member. As the maximum speed capability of the driving motor is approached, the lag increases more rapidly and the driven shaft finally falls out of synchronism with the control shaft.

The principal object of the present invention is to provide an improved method of and means for limiting the rate of operation of the control member of a servo system to prevent operation of the control at a rate exceeding the capabilities of the driven device.

Another object is to provide an improved method of and means for limiting the angle of lag of the output shaft with respect to the control shaft.

A further object is to provide improved means for controlling the speed of operation of the control input shaft of a servo system in response to the angular displacement between the input and output shafts. These and other and incidental objects will become apparent to those skilled in the art upon consideration of the following description with reference to the accompanying drawing which is a schematic circuit diagram of a servo system embodying the present invention.

An A.-C. motor 1 is mechanically connected to the load device 3, and to the rotor of a synchro transformer 5. The rotor of the transformer 5 is electrically connected to an amplifier 7 which is connected to the input circuit of the motor 1. The stator winding of the transformer 5 is electrically connected to the stator winding of a second synchro transformer 9. The rotor winding of the transformer 9 is connected to an A.-C. supply, not shown. The rotor of the transformer 9 is mechanically coupled to a control device such as a manually operable crank 11.

The system as thus far described constitutes a conventional servo system of the follow-up type. In operation, the control member 11 is moved to

2 an angular position corresponding to that to which it is desired to operate the driven device 3. Alternating current is transmitted through the cascaded synchro transformers 5 and 9 to the input circuit of the amplifier 7. The amplitude of the input voltage to the amplifier 7 is directly proportional to the difference in the angular positions of the rotors of the transformers 5 and 9. This voltage is amplified and is applied to the motor 1, driving the output shaft, and with it the device 3 to such a position that the rotor of the transformer 5 corresponds in angular position with the rotor of the transformer 9. When this condition is attained the voltage applied to the input circuit of the amplifier 7 is zero, and the motor 1 is deenergized.

Ordinarily, the driving motor is of the induction or repulsion type, and hence cannot operate above a predetermined speed, corresponding to the synchronous speed. This speed depends upon construction of the motor and upon the frequency of the A.-C. supply. As mentioned above it is undesirable to operate the control shaft at a speed approaching the synchronous speed of the driving motor because of the resultant increase in lag, and the possibility that the driven shaft may fall out of step with the control member. Accordingly, an A.-C. motor 13 is mechanically coupled to the control shaft and electrically connected to the output of the synchro transformer 5. The coupling between the motor 13 and the rotor of the control transformer 9 includes gearing 15, so designed that the synchronous speed of the motor 13 will occur at a speed of rotation of the control member 11 which is somewhat less than the synchronous speed of the driving motor 1. In the normal operation of the system the output voltage of the transformer 5 is of the order of 1 percent of the A.-C. supply voltage. This voltage, when applied to the motor 13, will produce substantially no effect. However, when the angular lag between the rotor of the transformer 5 and that of the transformer 9 approaches 90°, the output of the transformer 5 increases to a value of the same order of magnitude as the supply voltage. If, at the same time, the speed of rotation of the motor 13, due to the operation of the control input device 11, is substantially equal to the synchronous speed of said motor, a strong synchronizing torque is developed which effectively resists any increase in speed. By the proper selection of gear ratios, this condition can be caused to occur at any preselected speed of the driving motor 1.

Thus the invention has been described as an improved electrical servo system of the follow-up type, including means for preventing the operation of the control input member at a rate greater than a predetermined fraction of the synchronous speed of the driving motor. This is accomplished by coupling an auxiliary A.-C. motor to the input shaft, and connecting said motor to the electrical control channel of the system. The arrangement is such that the auxiliary motor reaches synchronism at a lower speed of operation of the control shaft than the driving motor. At synchronous speed of the auxiliary motor, a strong lock-in torque is developed, effectively preventing any further increase in speed.

I claim as my invention:

1. A remote control system including a driven shaft, a control shaft, means for deriving an A.-C. control voltage proportional in amplitude to the difference in the angular positions of said shafts, a control member connected to said control shaft and to an A.-C. motor, and means for applying said A.-C. voltage to said motor so as to prevent operation of said control member above a predetermined speed.

2. In a remote control system of the follow-up type, comprising a driving motor, a load shaft connected to said motor, a control shaft and means for deriving a control signal related in a predetermined manner to the difference in the angular positions of said shafts, a motor coupled to said control shaft and connected to respond to said control signal so as to prevent operation of said control shaft at a speed exceeding the maximum speed of said driving motor.

3. A servo system comprising a driving motor, an output shaft coupled to said motor, a synchro transformer coupled to said output shaft, an amplifier connected between the rotor winding of said synchro transformer and said driving motor, a second synchro transformer with its stator winding connected to the stator winding of said first synchro transformer and its rotor coupled to a control shaft, a source of A.-C. energy connected to the rotor winding of said second synchro transformer, and an A.-C. motor coupled to said control shaft and connected to the rotor of said first synchro transformer.

4. The invention as set forth in claim 3 wherein said A.-C. motor is coupled to said control shaft in such a manner that the rate of rotation of said A.-C. motor is a greater fraction of the synchronous speed of said motor than the speed of said driving motor is of the synchronous speed of said driving motor.

JAMES W. CONKLIN.